US006794781B2

(12) United States Patent
Razzell et al.

(10) Patent No.: US 6,794,781 B2
(45) Date of Patent: Sep. 21, 2004

(54) COMPACT ELECTRICAL MACHINE (75) Inventors: Anthony G. Razzell, Derby (GB);
John J A Cullen, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/406,504

(22) Filed: Apr. 4, 2003

(65) Prior Publication Data

US 2004/0108781 A1 Jun. 10, 2004

(30) Foreign Application Priority Data

Apr. 13, 2002 (GB) .............................................. 0208565

(51) Int. Cl.$^7$ ........................ H02K 16/00; H02K 51/00
(52) U.S. Cl. ..................... 310/114; 290/55; 310/156.01; 310/266
(58) Field of Search ................................. 310/114, 115, 310/118, 156, 266; 290/55

(56) References Cited

U.S. PATENT DOCUMENTS

| 396,355 | A | * | 1/1889 | Dyer ........................... 310/114 |
| 1,913,371 | A | * | 8/1933 | Cleaver ........................ 310/96 |
| 2,864,016 | A | * | 12/1958 | Waltscheff .............. 310/102 R |
| 3,683,249 | A | * | 8/1972 | Shibata et al. ............... 318/730 |
| 5,633,555 | A | | 5/1997 | Ackermann |
| 5,783,893 | A | * | 7/1998 | Dade et al. ................. 310/226 |
| 5,793,136 | A | * | 8/1998 | Redzic ........................ 310/114 |
| 5,994,809 | A | | 11/1999 | Ackermann |
| 6,590,312 | B1 | * | 7/2003 | Seguchi et al. ............. 310/266 |

FOREIGN PATENT DOCUMENTS

| DE | 10154034 A1 | * | 5/2004 | ............ H02K/1/22 |
| GB | 409501 P | | 5/1934 | |
| GB | 2278242 A | * | 11/1994 | .......... H02K/51/00 |
| GB | 2287585 A | | 9/1995 | |

* cited by examiner

Primary Examiner—Burton Mullins
(74) Attorney, Agent, or Firm—W. Warren Taltavull; Manelli Denison & Selter PLLC (57) ABSTRACT

An electrical machine comprises a combined magnetic gearbox and electrical generator. A first set of permanent magnets (30) are arranged on a rotor (16) to produce a spatially variable first magnetic field. A second set of permanent magnets (32) are arranged on a rotor (40,41,43), stationary pole pieces (36) are positioned between the first set of permanent magnets (30) and the second set of permanent magnets (32) to interfere with the first magnetic field. Rotation of the rotor (16) relative to the pole pieces (36) produces a second magnetic field which rotates the second set of permanent magnets (32). A stator (42) has windings (46) to transduce a changing second magnetic field produced by the rotation of the second set of permanent magnets (32) into an electrical voltage. The electrical machine is useful for a wind turbine generator. Alternatively the arrangement may be modified to produce an electrical motor.

18 Claims, 5 Drawing Sheets

COMPACT ELECTRICAL MACHINE

The present invention relates to a compact electrical machine. In particular, it relates to the integration within the same volume of a magnetic gearing mechanism and an electrical generator/electrical motor.

Figure 1:
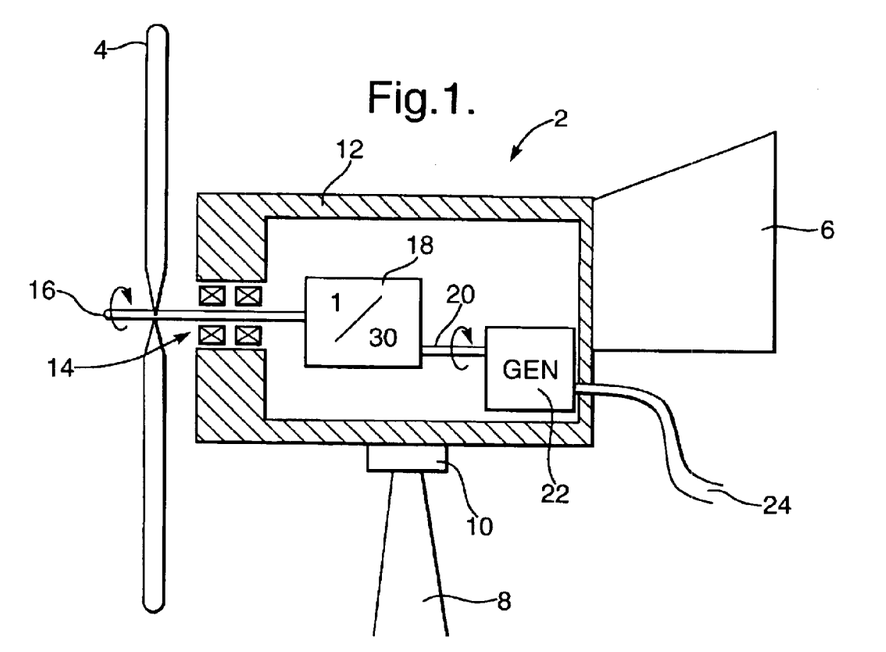
FIG. 1 is a schematic illustration of a prior art wind turbine.

FIG. 1 illustrates a wind turbine generator 2 having a housing 12 mounted on support 8 via swivel 10. The wind turbine generator 2 has a rotor 4 having a plurality of blades mounted on a low speed rotor shaft 16. A tail vane 6 attached to the housing 12 orients the wind turbine generator 2 in the wind so that the blades of the rotor 4 can drive the low speed rotor shaft 16 at low velocities, typically 60 rpm. The low speed rotor shaft 16 is supported using large bearings 14. The low speed rotation of the low speed rotor shaft 16 is converted into a high speed rotation of a generator shaft 20 using a mechanical gearbox 18. The generator shaft 20, which in this example is rotating at 1800 rpm, drives the electrical generator 22 which produces an electrical output 24. The use of a gearbox 18 to convert the low speed rotation of low speed rotor shaft 16 to the high speed rotation of the generator shaft 20 is particularly important in applications where an electrical generator 22 of reduced size is required, such as in wind turbine generators 2.

One problem with the mechanical gearbox 18, is that it requires maintenance. It has been suggested, in "A novel high-performance magnet gear", K. Atallah et al, IEEE Transactions on Magnetics, vol. 37, no. 4, pt. 1, pp 2844–6, that if rare-earth magnets are used in a magnetic gearbox, then such a magnetic gearbox could be used as a substitute for the mechanical gearbox 18.

Figure 2:
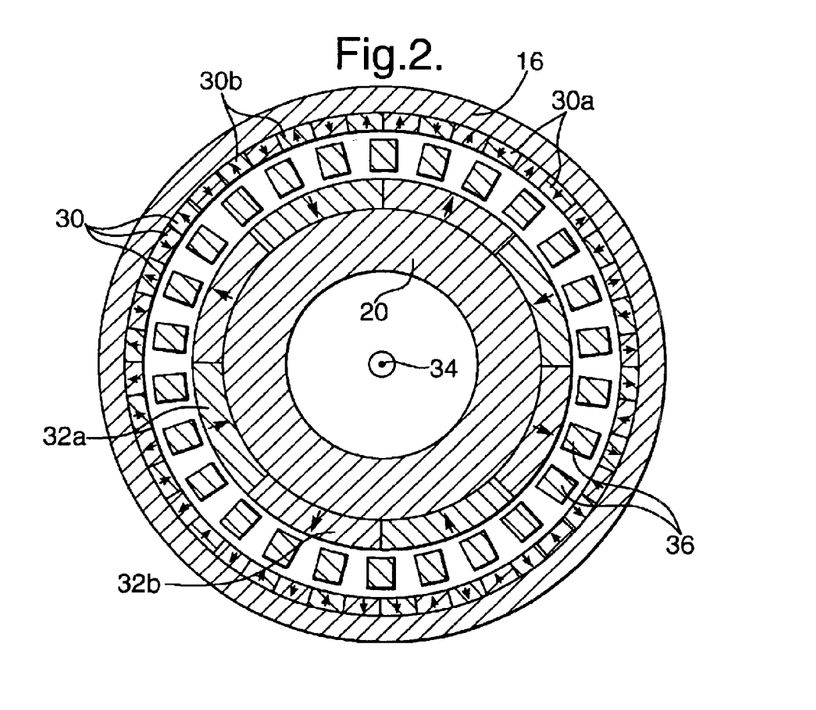
FIG. 2 is a schematic illustration of a known magnetic gear.

A cross-section of a magnetic gearbox is illustrated in FIG. 2. A high speed rotor shaft 20 of reduced diameter is supported within and coaxial with a cylindrical low speed rotor shaft 16 of larger diameter. The low speed rotor shaft 16 has a large number (P1) of permanent magnet pole-pairs 30 on the inner surface of the cylinder. The magnets 30 are attached to the inner surface of the steel low speed rotor shaft 16 and extend parallel to one another along a common axis of rotation 34 for the low speed rotor shaft 16 and the high speed rotor shaft 20. The magnets 30 are oriented so that the sources and sinks of flux are aligned perpendicularly to the axis 34. The orientation of the magnets 30 alternates. Every second magnet 30a has a source of flux directed towards the axis 34 of the low speed rotor shaft 16 and the adjacent magnets 30b have their sinks directed towards the axis 34 of the low speed rotor shaft 16. The high speed rotor shaft 20 has a smaller number (P2) of permanent magnetic pole-pairs 32 attached to its outer surface. The high speed rotor shaft 20 is coaxial with the low speed rotor shaft 16. The magnets 32 are oriented so that the sources and sinks of flux are aligned perpendicularly to the axis 34. The orientation of the magnets alternates. Every second magnet 32a has a source of flux directed towards the axis 34 of the high speed rotor shaft 20 and the adjacent magnets 32b have their sinks directed towards the axis 34 of the high speed rotor shaft 20. A large number (N) of stationary soft iron pole-pieces 36 are located between the exterior of the high speed rotor shaft 20 and the interior of the low speed rotor shaft 16 between the magnets 32 and 30. The stationary pole-pieces 36 are located at a fixed distance from the common axis 34 and are evenly distributed about that axis. The gearbox operates by locking one shaft's magnetic field onto a space harmonic of the magnetic field created by the other shaft. The gear ratio is given in the simplest case by $G=P2 \div P1$ when $N=P1+P2$. The low speed rotor shaft 16 when driven at a low speed causes the high speed rotor shaft 20 to rotate at a high speed, thus torque is transmitted from one shaft to the other at a fixed gear ratio.

It would be desirable to further improve electric machines which drive or are driven by gears.

According to one aspect of the present invention there is provided, an electrical generator arrangement comprising: a first plurality of permanent magnets collectively producing a spatially variable first magnetic field; a second plurality of permanent magnets arranged to rotate about a first axis; interference means positioned between the first plurality of permanent magnets and the second plurality of permanent magnets to interfere with the first magnetic field; motive means for moving the first plurality of permanent magnets and interference means relative to one another, to produce a second magnetic field for rotating the second plurality of permanent magnets; and a stator having windings arranged to transduce a changing magnetic field produced by the rotation of the second plurality of permanent magnets into electrical energy. According to one embodiment, the magnetic interference means are stationary and the first plurality of permanent magnets are mounted to rotate about the first axis.

According to this aspect of the present invention there is also provided a method of generating electricity comprising the steps of: interfering with a first magnetic field produced by a first plurality of permanent magnets to form beats (regular variations) in the first magnet field; using said beating first magnetic field to rotate a second plurality of permanent magnets; and transducing the time variable magnetic field produced by the rotating second plurality of permanent magnets into electrical energy.

According to another aspect of the present invention there is provided an electrical motor arrangement comprising: a first plurality of permanent magnets collectively producing a spatially variable first magnetic field; a second plurality of permanent magnets arranged to rotate about a first axis; interference means positioned between the first plurality of permanent magnets and the second plurality of permanent magnets to interfere with the first magnetic field and motive means for moving the first plurality of permanent magnets and interference means relative to one another, to produce a second magnetic field for rotating the second plurality of permanent magnets, said motive means comprising a stator having windings for transducing a changing electric field in the windings into the rotation of the first plurality of permanent magnets.

According to this aspect of the present invention there is also provided a method of transducing time varying electrical energy into the rotation of a motor shaft, comprising the steps of: using the time varying electrical energy to rotate a first plurality of permanent magnets; interfering with a first magnetic field produced by the rotating first plurality of permanent magnets to form beats in the first magnet field; and using said beating first magnetic field to rotate a second plurality of permanent magnets attached to the motor shaft.

The first magnetic field preferably varies regularly in space. In the air gap adjacent the second plurality of permanent magnets (without the interference means being present) it preferably has an approximately sinusoidal relationship to the radial angle with a period $2\pi/P1$ where the first plurality of permanent magnets comprises P1 pole-pairs.

The interference means may regularly alternate between soft-ferromagnetic elements and non-ferromagnetic elements. The soft-ferromagnetic elements may be iron pole pieces, preferably of the same size with regular gaps between them such that they are evenly distributed at a fixed radius about the first axis. The first plurality P1 of permanent magnets and the second plurality of permanent magnets P2 preferably have a plurality N of pole-pieces located between them such that N=P1+P2. The relative motion between the first plurality of permanent magnets and the interference means produces beating in the first magnetic field.

Preferably, the first plurality of permanent magnets are attached to a soft-ferromagnetic support and the second plurality of permanent magnets are supported without attachment to soft-ferromagnetic material. The second plurality of permanent magnets may be bonded to a non-ferromagnetic support such as glass reinforced plastics (GRP).

The arrangement may have a radial flux geometry with the second plurality of permanent magnets arranged in a cylinder with an air gap of typically 3–5 mm between the stator and the cylinder. The first plurality of permanent magnets may be supported, using a first support, at a first fixed radius from the first axis and the second plurality of permanent magnets may be supported, using a second support and the first support, at a second fixed radius from the first axis, wherein a shaft and a plurality of bearings couple the first and second supports. Preferably, the first support and the second support rotate independently about the shaft on the plurality of bearings and the first support rotates relative to a housing on large bearings. The stationary pole pieces may be supported using a third supporting structure at a third fixed radius intermediate of the first and second fixed radii.

The support for the second plurality of permanent magnets may provide for air circulation over the stator when in use.

A preferred use of the arrangement is in a wind turbine generator having large bearings supporting the turbine rotor shaft, which is integral or attached to the support for the first plurality of permanent magnets.

A particular advantage of embodiments of the invention is that lubricating oil is not essential to the operation of the electrical machine. This is particularly attractive from an operating cost perspective for machines located at remote sites. Accordingly embodiments of the invention require little maintenance, are of compact size and of reduced weight.

For a better understanding of the present invention and to understand how the same may be brought into effect reference will now be made, by way of example only, to the accompanying drawings in which.

Figure 3:
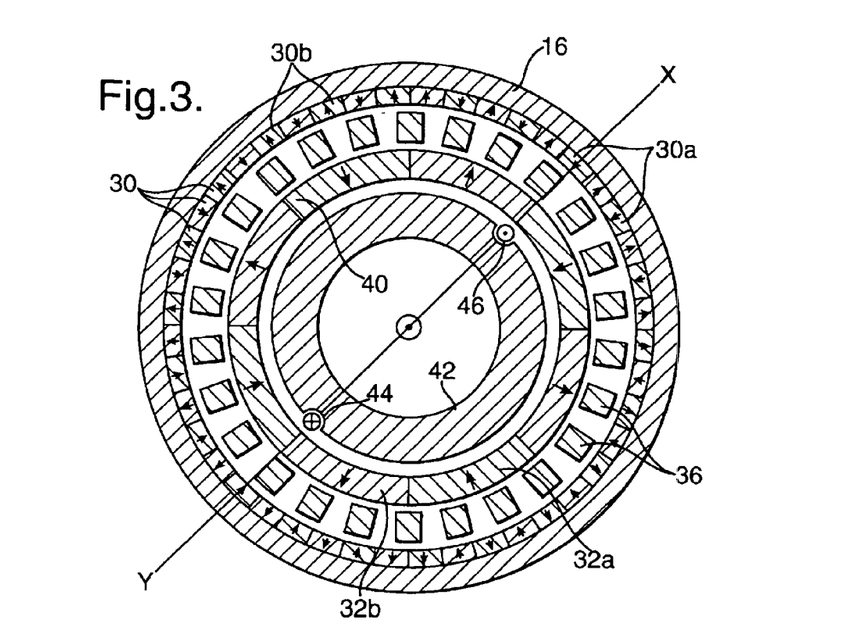
FIG. 3 is a schematic cross-sectional view of one electrical machine embodiment of the present invention.

FIG. 3 schematically illustrates an electrical machine comprising a combined magnetic gearbox and electrical generator, having a radial flux geometry, according to one embodiment of the present invention. The low speed rotor shaft 16, the permanent magnets 30 and the stationary pole-pieces 36 are all arranged in the same manner as described in relation to FIG. 2. There is no high speed rotor shaft 20 in FIG. 3. The permanent magnets 32 are held in position as a rotating cylinder 40 by a magnetically transparent support for example by being bonded in a polymer composite carrier sleeve. A soft iron cylindrical stator 42 is positioned coaxially in the interior of the cylinder 40. The stator 42 has on its outer surface a number of slots 44 each of which receives a stator conductor 46. When used in the wind turbine of FIG. 1, the stator conductors 46 are electrically connected to the electrical output 24.

The low speed rotation of the low speed rotor shaft 16 and its associated magnets 30, produces a space harmonic of the magnetic field which causes the cylinder 40 of magnets 32 to rotate at a high speed. The magnetic flux lines from the magnets 32 penetrate the stator 42 and surround the stator conductors 46. The high speed movement of the magnets 32 produces a rapidly time-varying magnetic flux in the vicinity of the conductors 46 and induces an electric voltage therein. A cross-section along the line X–Y in FIG. 3 is shown in FIG. 4.

Figure 4:
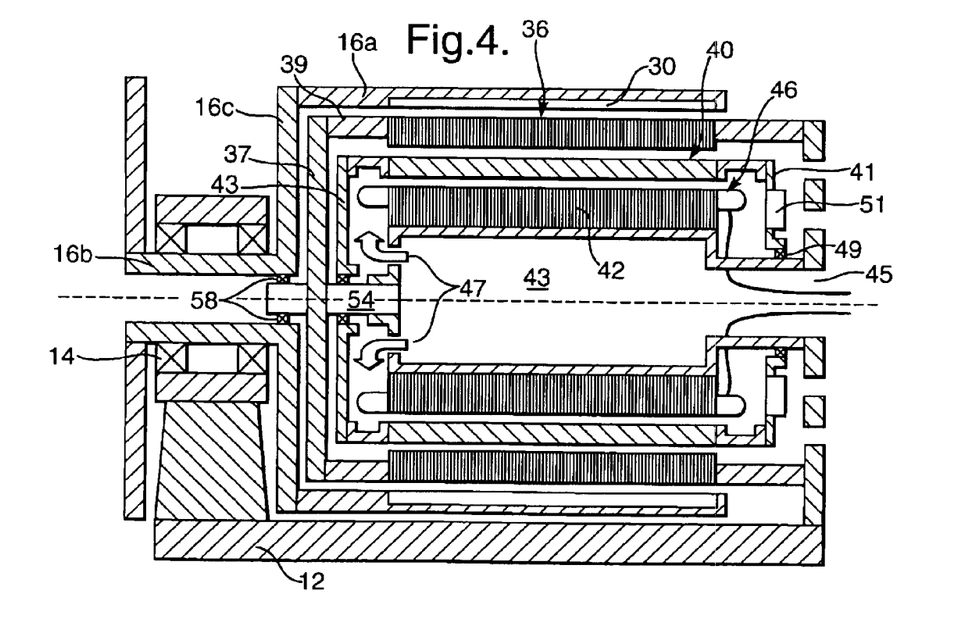
FIG. 4 is a schematic view taken along the line X–Y in FIG. 3.

In FIG. 4, the cylindrical stator 42 has an internal cylindrical cavity 43 with an external opening 45 at one end and a plurality of off-axis 34 openings 47 at the opposing second end. The cylindrical stator 42 is supported by a stub shaft 54 extending outwardly along the axis 34 from the second end of the cylindrical stator 42.

Each of the stationary pole-pieces 36 extends parallel to the axis 34. A radial support 37 extends radially from the stub shaft 54 for each of the pole-pieces 36. The radial support 37 holds a pole-piece 36 at a fixed distance from the axis 34. The radial support 37 connects to one end of an axial support 39 which supports each pole-piece 36 parallel to the axis 34.

The stub shaft 54, the pole-pieces 36, the radial support 37, the axial support 39 and the cylindrical stator 42 are all stationary.

The cylinder 40 comprising magnets 32 extends between the cylindrical stator 42 and the pole-pieces 36. The cylinder 40 is maintained coaxial with the axis 34 by supports 41 and 43 at its ends. Small bearings 49 rotatably mount the supports 41 and 43 to the exterior of the cylindrical stator 42 and to the exterior of the stub shaft 54 respectively. The small bearings 49 allow the cylinder 40 to rotate about the axis 34.

The low speed rotor shaft 16 has two portions of different dimension. A large diameter portion 16A carries the magnets 30 on its interior surface and it encloses the stationary pole-pieces 36. The low speed rotor shaft 16 has a portion 16B of reduced diameter where it is supported by large bearings 14 between the exterior of the portion 16B and a housing 12. The portions of large and reduced diameter 16A, 16B are connected by a portion 16C extending perpendicularly to the axis 34. The low speed rotor shaft 16 is cylindrical in both the large diameter portion 16A and the reduced diameter portion 16B. The stub shaft 54 extends into the interior cylindrical region of the reduced diameter portion 16B of the low speed rotor shaft 16 and the stub shaft 54 is supported in this position by small bearings 58 between its exterior cylindrical surface and the interior cylindrical surface of the reduced diameter portion 16B of the low speed rotor shaft 16. Thus the small bearings 58 allow the low speed rotor shaft 16 to rotate relative to the stub shaft 54, the stationary pole-pieces 36 and the stationary cylindrical stator 42 and the large bearings 14 allow the low speed rotor shaft 16 to rotate relative to the housing 12. The small bearings 58 which rotatably mount the stub shaft 54 in the low speed rotor shaft 16 are located adjacent the large bearings 14. The stub shaft 54 is held in position via the large bearings 14, a short (or non-existent) portion of the reduced diameter portion 16B of the low speed rotor shaft 16, and the small bearings 58. This is a particularly stiff structure and strongly constrains the support 37 to be perpendicular to the axis 34 and thus strongly constrains the stationary pole-pieces 36 to run parallel to the axis 34. This constructional arrangement therefore allows there to be small air gaps (3–5 mm) between the cylindrical stator 42 and the rotating cylinder 40, between the rotating cylinder 40 and the stationary pole-pieces 36, and between the stationary pole-pieces 36 and the low speed rotor shaft 16. Such small air gaps provide increased efficiency.

The supports 41 of the cylinder 40, preferably have a plurality of openings, each with an associated vane 51. The vanes 51 are oriented such that when the cylinder 40 rotates air is forced through the openings. This provides for circulation of air via these openings, the air gap between the cylindrical stator 42 and the cylinder 40, the openings 47 in the cylindrical stator 42 and the opening 45 in the cylindrical stator 42. This movement of air cools the stator conductors 46 and allows high currents to flow and thus high torque density to be achieved.

The bearings described in the foregoing description, may be grease packed to avoid regular maintenance. The rare-earth magnets may be made from NdFeB. According to one embodiment, the diameter of the cylinder 40 is 700 mm, the circumferential width of the pole pieces 36 is 15 mm and the circumferential width of the magnets 30 on the low speed shaft is 20 mm.

In the preceding description of a radial flux generator, the cylindrical low speed prime mover with a large number (P1) of magnets (low speed rotor shaft 16) surrounds the cylindrical high speed secondary mover with a small number (P2) of magnets (cylinder 40), which surrounds the stationary stator 42. An alternative arrangement also has a radial flux geometry, but one in which a cylindrical stator 42 surrounds a high speed cylindrical secondary mover with a small number (P2) of magnets (the equivalent of the cylinder 40 in FIGS. 2 and 3, but with increased radius) and the high speed cylindrical secondary mover 40 encloses a low speed prime mover with a large number (P1) of magnets (the equivalent of low speed rotor shaft 16 in FIGS. 2 and 3, but with a reduced radius and with the large number of magnets 30 on its exterior surface, not its interior surface).

Figure 5:
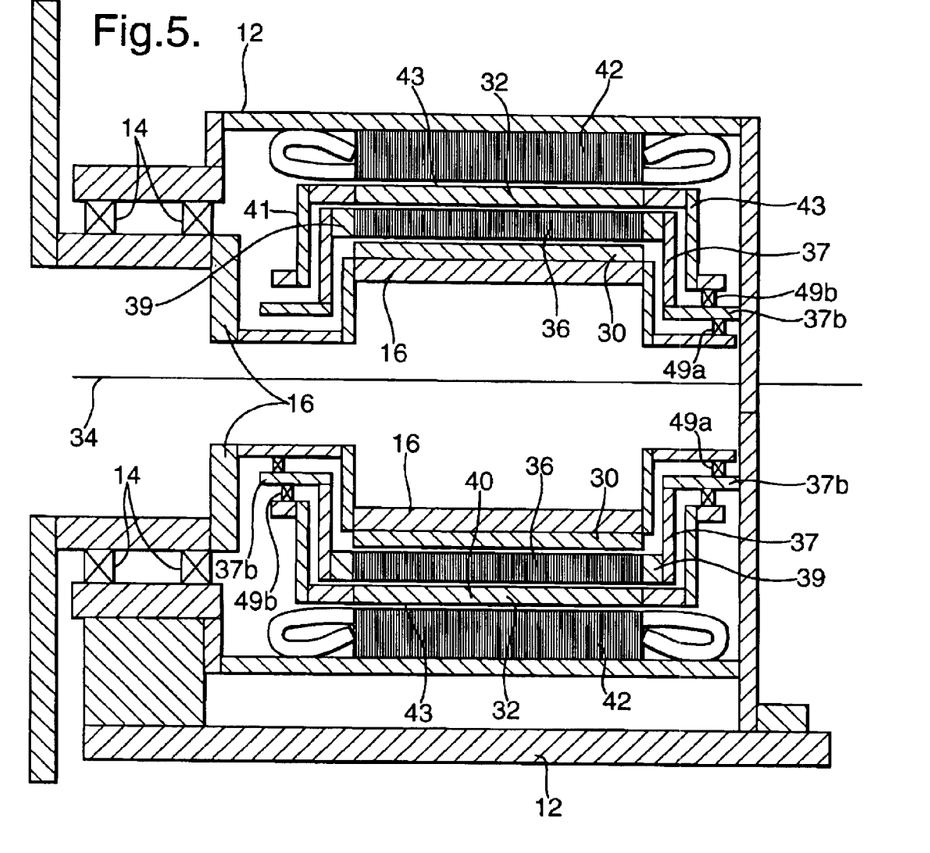
FIG. 5 is a schematic cross-sectional view of a second embodiment of the present invention having a radial flux geometry.

FIG. 5 illustrates the alternative radial flux arrangement for the electrical machine. A cylindrical stator 42 is attached to the housing 12 and is coaxial with axis 34. The cylindrical stator 42 has an internal cylindrical cavity 43 housing, at decreasing radial distances from axis 34, a high speed rotating cylinder 40 of P2 magnets 32, N stationary pole pieces 36 and a low speed rotor shaft 16 with P1 magnets 30 on its exterior surface. The low speed rotor shaft 16 is supported by large bearings 14 in the housing 12. The portion of the low speed rotor shaft 16 in the internal cylindrical cavity 43 of the cylindrical stator 42 carries a large number (P1) of the magnets 30 on its exterior surface and is circumferentially surrounded by the stationary pole pieces 36. Each of the stationary pole-pieces 36 extends parallel to the axis 34 and is connected to the housing 12. An axial support 39 supports each pole-piece 36 parallel to the axis 34. Radial supports 37 at one of their ends hold the axial support 39 at a fixed distance from the axis 34 and at the other end have cylindrical portions 37B co-axial with axis 34. One of the cylindrical portions is attached to the housing 12. Bearings 49A on the interior of the cylindrical portions 37B allow the low speed rotor shaft 16 to rotate relative to the stationary pole pieces 36. Bearings 49B on the exterior of the cylindrical portions 37B allow the cylinder 20 to rotate relative to the stationary pole-pieces 36. The cylinder 40 comprising a smaller number (P2) of the magnets 32 and surrounds the stationary pole pieces 36 within the internal cylindrical cavity 43 of the cylindrical stator 42. The cylinder 40 is maintained co-axial with the axis 34 by supports 41 and 43 at its ends. Small bearings 49B rotatably mount the supports 41 and 43 on the exterior of the cylindrical portions 37B of the radial supports 37. This embodiment provides for a higher speed of the magnets 32 relative to the stator 42 for a fixed angular velocity because the magnets 32 are at a greater radial distance in this embodiment.

Figure 6:
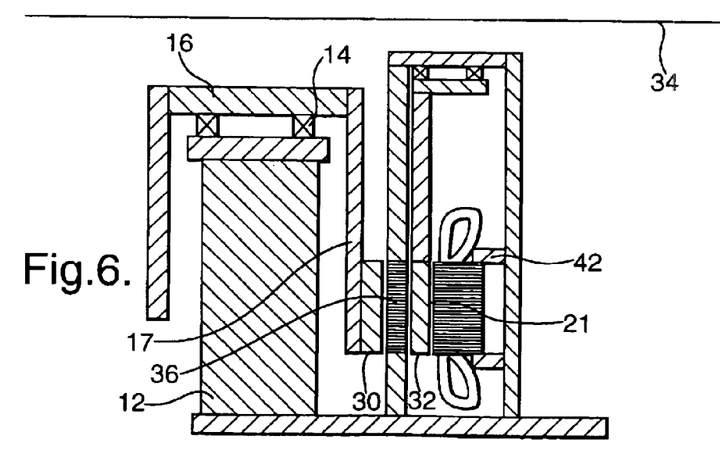
FIG. 6 is a schematic cross-sectional lower-half view of a third embodiment of the present invention having an axial flux geometry.

A further alternative arrangement uses an axial flux geometry instead of a radial flux geometry. In the radial flux geometry, the magnets' sources and sinks of flux are directed radially and the magnets 30 and 32 rotate about a common axis but with a fixed radial separation between them. An axial flux geometry is illustrated in FIG. 6 which shows a cross-sectional lower half section. In the axial flux geometry of FIG. 6, the magnets' sources and sinks of flux are directed axially and the magnets 30 and 32 rotate about the common axis 34 but with a fixed axial separation between them. The large number (P1) of magnets 30 are arranged around the circumference of a first circular disc 17 with alternating sources and sinks aligned perpendicular to the plane of the disc. Thus each magnet 30 is at a fixed radial distance R from the axis 34. A second parallel disc 21 supports the small number (P2) of magnets 32 each at the fixed distance R from the axis 34, with alternating sources and sinks directed perpendicular to the plane of the disc and towards the first disk 17. The N stationary pole-pieces 36 are regularly spaced at radius R between the two discs 17 and 21. The first disc 17 is connected to the low speed rotor shaft 16. The rotation of the first disk 17 at a low speed creates a time varying magnetic field having a space harmonic which drives the rotation of the second disk 21 at a higher speed. The time varying magnetic field produced by the magnets 32 of the high speed rotating disc 21 induces an electric field in a conductor of stator 42 located at radius R. The axial geometry is mechanically simpler.

Figure 7:
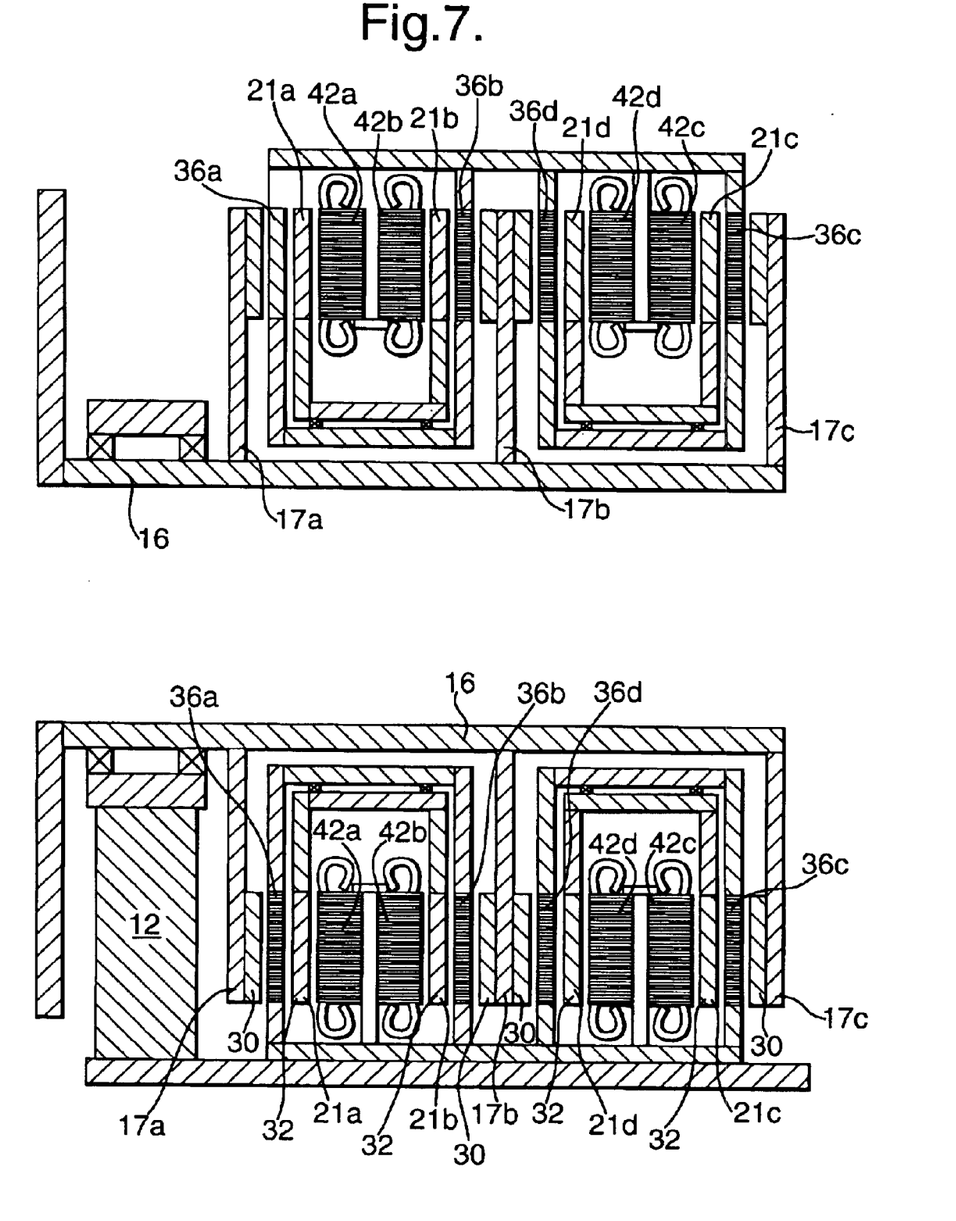
FIG. 7 is a schematic cross-sectional view of a third embodiment of the present invention having an axial flux geometry.

A further variant of the axial flux geometry is illustrated in FIG. 7, in which multiple discs 17A, 17B, 17C each carrying magnets 30 are attached to the low speed rotor shaft 16. Disc 17A positioned to the left of the arrangement and carrying magnets 30 at radius R on its right side, has associated stationary pole pieces 36A, disc 21A with magnets 32 at radius R and stator 42A. Disc 17C, positioned to the right of the arrangement and carrying magnets 30 at radius R on its left side, has associated stationary pole pieces 36C, disc 21C with magnets 32 at radius R and stator 42C. Disc 17B, positioned between disc 17A and 17C, has magnets 30 at radius R on both left and right sides and has associated with the left side stationary pole pieces 36B, disc 21B with magnets 32 at radius R and stator 42B and has associated with the right side stationary pole pieces 36D, disc 21D with magnets 32 at radius R and stator 42D.

In the above described embodiments, it is desirable to minimise the airgaps between the stator 42 and magnets 32, between magnets 32 and pole pieces 36 and between pule pieces 36 and magnets 30, while maintaining mechanical integrity. The support of the magnets 30 and 32 and the pole pieces 36 is therefore important.

Figure 8A:
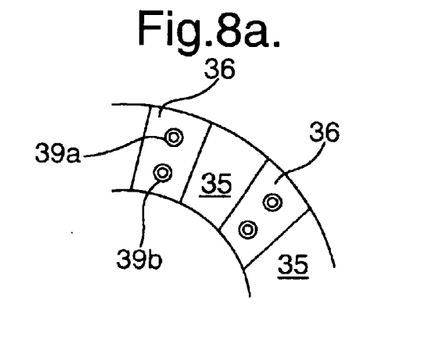
FIGS. 8a and 8b illustrate alternative arrangements for supporting pole-pieces 36.
Figure 8B:
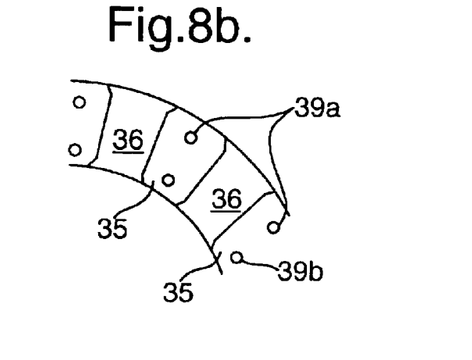

FIGS. 8a and 8b illustrate transverse sections through alternative arrangements for holding the pole pieces 36 in position. In FIG. 8a, the axial support 39 for pole piece 36 comprises first and second tie bars 39A and 39B. Each stationary pole-piece 36 is formed from a plurality of metallic elements threaded by the tie bars 39A and 39B. The metallic elements may be separated by insulating spacers made of glass reinforced plastics (GRP) or other suitable plastics material. The tie bars 39A and 39B have insulation sheaths and are preferably non-magnetic material such as titanium or austenitic stainless steel. Adjacent pole-pieces are separated by insulating spacers 35 made from plastics for example GRP. In FIG. 8b, a pole-piece 36 is supported by being sandwiched between two insulating spacers 35. The tie bars 39A and 39B go through holes in the insulating spacers 35. In this arrangement, the magnetic properties of the tie bars 39A and 39B are unimportant.

Figure 9A:
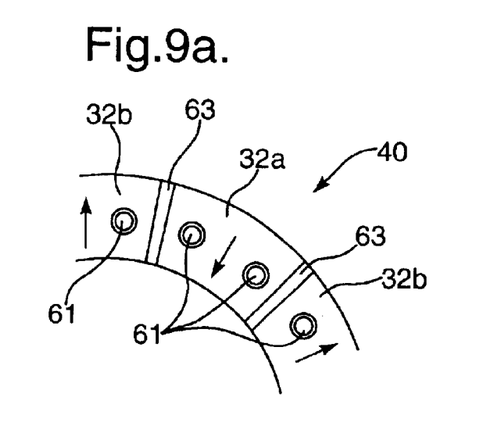
FIGS. 9a and 9b illustrates transverse views of alternative arrangements for supporting magnets 32.
Figure 9B:
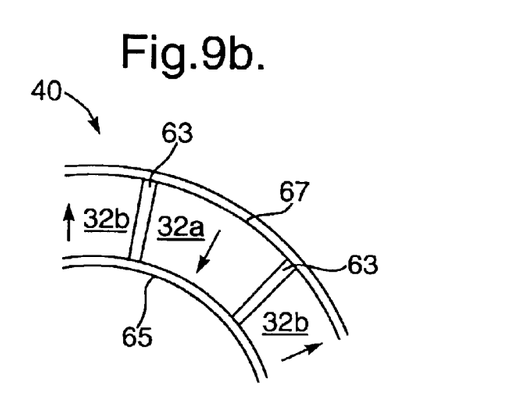

FIGS. 9a and 9b illustrate transverse section through two alternative arrangements for holding magnets 32 in cylinder 40. In FIG. 9a, the magnets 32 are threaded longitudinally onto tie bars 61 that are attached to end rings. GRP spacers 63 are preferably positioned between adjacent magnets 32a/32b to provide extra stiffness for the cylinder 40 and lengthen the path for flux leakage. The tie bars 61 have insulation sheaths and are preferably nonmagnetic material such as titanium or austenitic stainless steel.

Figure 9C:
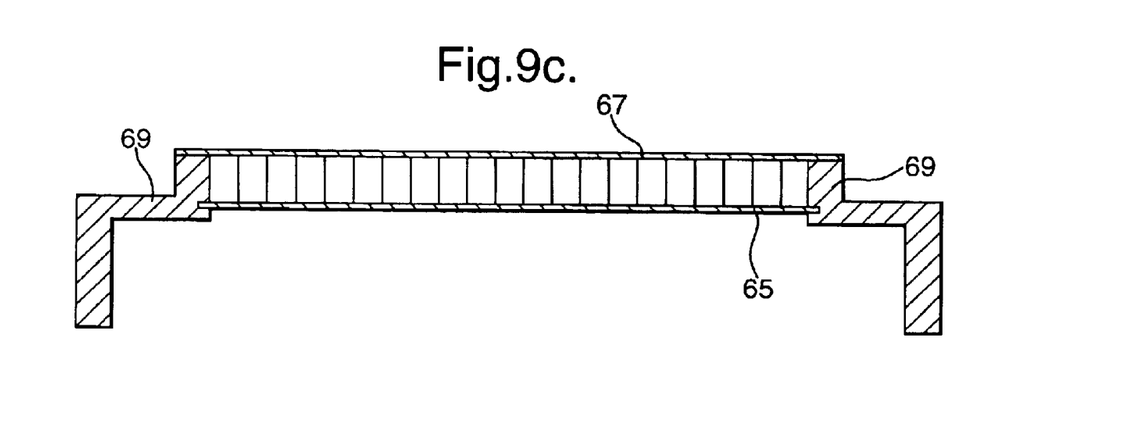
FIG. 9c illustrates a longitudinal view of the arrangement shown in FIG. 9b.

In FIG. 9b, the arrangement uses GRP tubes as a magnetically transparent support for the magnets 32. The magnets 32 are bonded to the exterior of a thin walled GRP cylinder 65 which is located into two end rings 69. A thin over-wrap 67 of GRP is then filament wound round the outside of the magnets 32 to locate them. GRP spacers 63 are preferably positioned between adjacent magnets 32a/32b to provide extra stiffness for the cylinder 40 and lengthen the path for flux leakage. A longitudinal section is shown in FIG. 9c.

The magnets 30 may be bonded directly onto steel.

Although in the preceding description emphasis has been placed on the generation of an electric field, it is well understood in the art that the mechanisms which transduce a mechanical rotation into a changing magnetic field and then into an electric current (i.e. a generator) can be reversed such that a changing electric field produces a changing magnetic field which produces a mechanical rotation (i.e. a motor). Although the preceding descriptions have concentrated on generators, embodiments of the invention are motors.

Whilst endeavouring in the foregoing specification to draw attention to those features of the invention believed to be of particular importance it should be understood that the Applicant claims protection in respect of any patentable feature or combination of features hereinbefore referred to and/or as shown in the drawings whether or not particular emphasis has been placed thereon.

What is claimed is:

1. An electrical generator arrangement comprising:
a first plurality of permanent magnets collectively producing a spatially variable first magnetic field;
a second plurality of permanent magnets arranged to rotate about a first axis;
interference means positioned between the first plurality of permanent magnets and the second plurality of permanent magnets to interfere with the first magnetic field;
motive means for moving the first plurality of permanent magnets and interference means relative to one another, to produce a second magnetic field for rotating the second plurality of permanent magnets; and
a stator having windings arranged to transduce a changing magnetic field produced by the rotation of the second plurality of permanent magnets into electrical energy.

2. An arrangement as claimed in claim 1 wherein the first plurality of permanent magnets are attached to a soft-ferromagnetic support and the second plurality of permanent magnets are supported without attachment to soft-ferromagnetic material.

3. An arrangement as claimed in claim 2, wherein the second plurality of permanent magnets are supported by a magnetically transparent material.

4. An arrangement as claimed in claim 1, wherein the second plurality of permanent magnets are arranged in a cylinder with an air gap of 3–5 mm between the stator and the cylinder.

5. An arrangement as claimed in claim 1, wherein the first plurality of permanent magnets is supported, using a first support, at a first fixed radius from the first axis and the second plurality of permanent magnets is supported, using a second support and the first support, at a second fixed radius from the first axis, wherein a shaft and a plurality of bearings couple the first and second supports.

6. An arrangement as claimed in claim 5, wherein the first support and the second support rotate independently about the shaft on the plurality of bearings and the first support rotates relative to a housing on large bearings.

7. An arrangement as claimed in claim 1 wherein the support for the second plurality of permanent magnets provides for air circulation over the stator when in use.

8. An electrical motor arrangement comprising:
a first plurality of permanent magnets collectively producing a spatially variable first magnetic field;
a second plurality of permanent magnets arranged to rotate about a first axis;
interference means positioned between the first plurality of permanent magnets and the second plurality of permanent magnets to interfere with the first magnetic field; and
motive means for moving the first plurality of permanent magnets and interference means relative to one another, to produce a second magnetic field for rotating the second plurality of permanent magnets, said motive means comprising a stator having windings for transducing a changing electric field in the windings into a rotation of the first plurality of permanent magnets.

9. An arrangement as claimed in claim 8 wherein the first plurality of permanent magnets are attached to a soft-ferromagnetic support and the second plurality of permanent magnets are supported without attachment to soft-ferromagnetic material.

10. An arrangement as claimed in claim 9, wherein the second plurality of permanent magnets are supported by a magnetically transparent material.

11. An arrangement as claimed in claim 8, wherein the second plurality of permanent magnets are arranged in a cylinder with an air gap of 3–5 mm between the stator and the cylinder.

12. An arrangement as claimed in claim 8, wherein the first plurality of permanent magnets is supported, using a first support, at a first fixed radius from the first axis and the second plurality of permanent magnets is supported, using a second support and the first support, at a second fixed radius from the first axis, wherein a shaft and a plurality of bearings couple the first and second supports.

13. An arrangement as claimed in claim 12, wherein the first support and the second support rotate independently about the shaft on the plurality of bearings and the first support rotates relative to a housing on large bearings.

14. An arrangement as claimed in claim 8 wherein the support for the second plurality of permanent magnets provides for air circulation over the stator when in use.

15. A wind turbine generator comprising an arrangement as claimed in claim 1.

16. A wind turbine generator comprising an arrangement as claimed in claim 6, wherein the large bearings support the turbine rotor shaft.

17. A method of generating electricity comprising the steps of:

interfering with a first magnetic field produced by a first plurality of permanent magnets to form beats in the first magnet field;

using said beating first magnetic field to rotate a second plurality of permanent magnets; and transducing the time variable magnetic field produced by the rotating second plurality of permanent magnets into electrical energy.

18. A method of transducing time varying electrical energy into the rotation of a motor shaft, comprising the steps of:

using the time varying electrical energy to rotate a first plurality of permanent magnets;

interfering with a first magnetic field produced by the rotating first plurality of permanent magnets to form beats in the first magnet field; and using said beating first magnetic field to rotate a second plurality of permanent magnets attached to the motor shaft.

\* \* \* \* \*